US009183454B1

(12) United States Patent
Ames et al.

(10) Patent No.: US 9,183,454 B1
(45) Date of Patent: Nov. 10, 2015

(54) AUTOMATED TECHNIQUE FOR GENERATING A PATH FILE OF IDENTIFIED AND EXTRACTED IMAGE FEATURES FOR IMAGE MANIPULATION

(71) Applicant: LOCKHEED MARTIN CORPORATION, Bethesda, MD (US)

(72) Inventors: Brian Michael Ames, Mogadore, OH (US); Scott S. Hulet, Wadsworth, OH (US); Dave Foster, North Canton, OH (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 335 days.

(21) Appl. No.: 13/669,679

(22) Filed: Nov. 6, 2012

Related U.S. Application Data

(60) Provisional application No. 61/672,124, filed on Jul. 16, 2012.

(51) Int. Cl.
*G06K 9/48* (2006.01)
*G06K 9/46* (2006.01)
*G06K 9/66* (2006.01)
*G06T 7/00* (2006.01)

(52) U.S. Cl.
CPC ............... *G06K 9/4604* (2013.01); *G06K 9/46* (2013.01); *G06T 7/0085* (2013.01)

(58) Field of Classification Search
CPC ...... G06T 15/00–15/005; G06T 17/00–17/005
USPC .................................................. 345/419, 420
See application file for complete search history.

(56) References Cited

U.S. PATENT DOCUMENTS 7,660,468 B2 * 2/2010 Gokturk et al. ............... 382/224

* cited by examiner

*Primary Examiner* — Jacinta M Crawford
(74) *Attorney, Agent, or Firm* — Terry M. Sanks, Esq.; Beusse Wolter Sanks & Maire, PLLC (57) ABSTRACT

A method for identifying, by at least one processor, at least one feature in a raster image based on a set of extraction parameters, and generating, by the at least one processor, a feature path file conforming to a vector format, the feature path file represents a plurality of instances of the at least one feature in the raster image. A system and computer program product are also disclosed.

18 Claims, 6 Drawing Sheets

AUTOMATED TECHNIQUE FOR GENERATING A PATH FILE OF IDENTIFIED AND EXTRACTED IMAGE FEATURES FOR IMAGE MANIPULATION

CROSS-REFERENCE TO RELATED APPLICATIONS

This application claims the benefit of U.S. Provisional Application No. 61/672,124 filed Jul. 16, 2012, and incorporated herein by reference in its entirety.

BACKGROUND

Embodiments relate to image processing, and, more particularly, to an automated technique for generating a path file of identified and extracted image features for image manipulation.

It is common practice to identify features like doors and windows from the images used in modeling and/or simulations. Identifying features in an image allows the assignment of different material codes to regions of the image. It also allows parts of the image to be selectively adjusted to create night scenes from day scenes. However, the benefits of identifying the features from an image are often overshadowed by the time-consuming nature of the processes currently available for feature identification and feature based manipulation of graphic images.

Current approaches to features extraction typically require a user to manually identify (i.e., outline and fill) the features that are to be extracted within an image manipulation software program. The amount of time required to perform feature based manipulation of graphic images increases with the quantity and types of features contained in the image.

For example, extracting the windows from an image of a single house takes significantly less time than identifying the windows from an image of a city street having multiple buildings and performing manipulations based on the identified windows. More features require more time because the user must detect or identify each feature individually.

The typical efficiency short-cut, "copy and paste," provides some help to the user, especially when the features are uniform. However, each pasted area must still be individually placed upon the corresponding feature's content as expressed in an image. Further, this usefulness is significantly reduced when the features lie on varying planes of perspective (i.e., a copy of an extraction area for a front-facing window will not match that of a side-facing window).

BRIEF SUMMARY

Embodiments relate to a system, method, and computer program product for automatically generating a path file of identified and extracted image features for image manipulation. An embodiment of the method comprises identifying, by at least one processor, at least one feature in a raster image based on a set of extraction parameters, and generating, by the at least one processor, a feature path file conforming to a vector format, the feature path file represents a plurality of instances of the at least one feature in the raster image.

An embodiment of the system comprises an extraction engine configured to identify at least one feature in a raster image based on a set of extraction parameters. The extraction engine is further configured to generate a feature path file conforming to a vector format. The feature path file represents a plurality of instances of the at least one feature in the raster image, and a data storage is configured to store the raster image and/or the feature path file of the raster image.

An embodiment of the computer program product, provided by a non-transitory processor readable storage medium, comprises a computer software code that, when executed on a processor, causes the processor to identify at least one feature in a raster image based on a set of extraction parameters, and generate a feature path file conforming to a vector format, the feature path file represents a plurality of instances of the at least one feature in the raster image.

DETAILED DESCRIPTION

Figure 1:
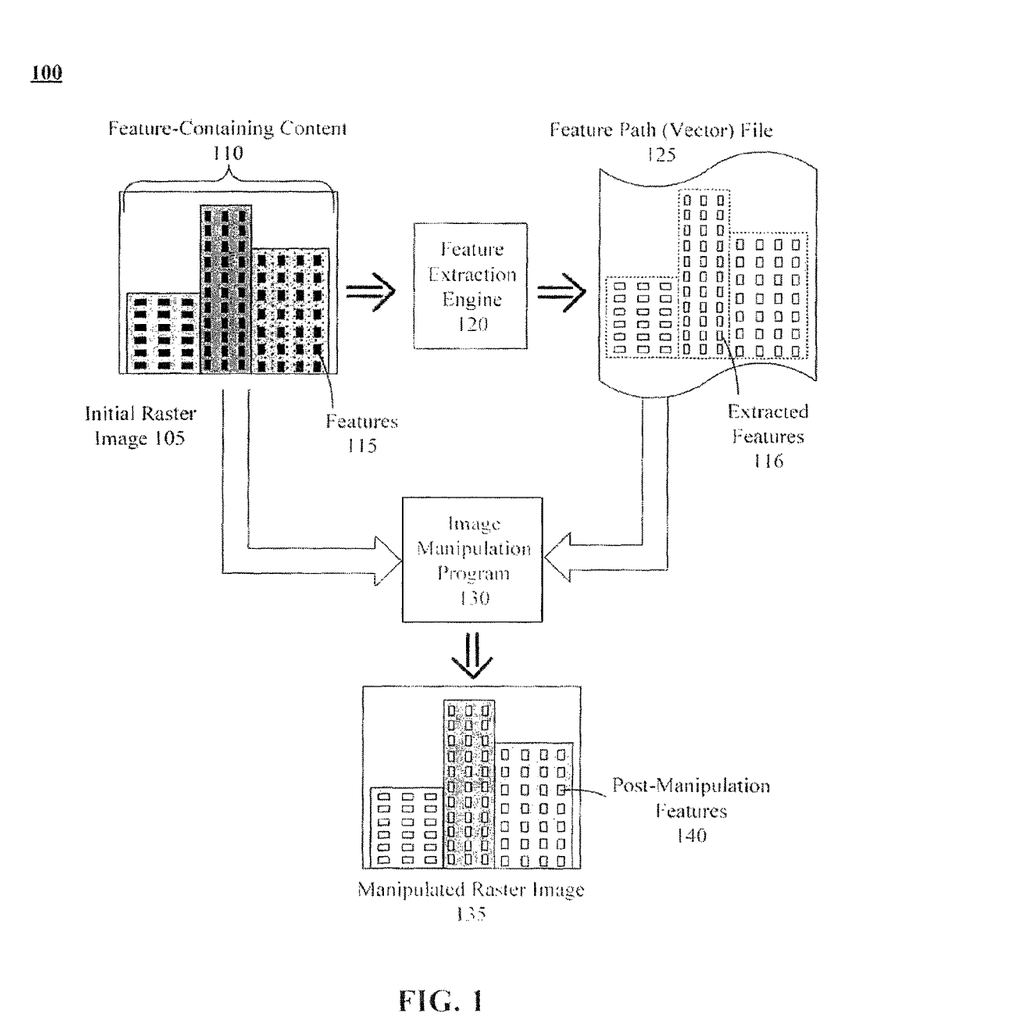
FIG. 1 is a block diagram illustrating a high level overview of the feature identification and extraction process to allow for raster image manipulations of at least one feature in accordance with an embodiment.

FIG. 1 is a block diagram 100 illustrating a high level overview of the feature identification and extraction process to allow for raster image manipulations of one or more features of the raster image. The process utilizes a feature extraction engine 120 to automate the generation of a feature path file 125 for an initial raster image 105 in accordance with an embodiment. In diagram 100, the initial raster image 105 has feature-containing content 110, which includes a set of one or more features 115 in the image 105. The set of one or more features 115 may be an architectural detail such as a window, a gutter, an entrance way, and the like, of a structure or building. However, embodiments are not limited to raster images of architectural structures, and may be used to identify and extract features from any raster image to generate a feature path file where subsequent manipulation of the raster image, based on the generated feature path file, is possible. Thus, the feature may correspond to a specific type or category of an object contained in the raster image 105. Each feature of the set of one or more features 115 is represented and identified as a series of pixels or sub-pixels in a raster image.

The feature extraction engine 120 determines, detects or identifies boundaries or regions for each feature of the set of one or more features 115. In an embodiment, the feature extraction engine 120 may determine, detect or identify each feature through pattern recognition. For example, if a feature is a window and this feature is designated for extraction, the feature extraction engine 120 determines the edges or boundaries of each instance of the window as expressed within the initial raster image 105. The boundaries are defined using geometrical primitives, such as points, lines, curves, shapes, or polygons. For example, a window (an example of a feature) may be defined as a rectangle having four line segments and four points. Thus, the feature extraction engine 120 can use a vector representation or a vector format to define detected features. This vector representation specified in the feature path file 125 is referred to as an extracted feature 116.

An image manipulation (IM) program or engine 130, when executed, may conduct a graphic manipulation operation against the initial raster image 105 that results in a manipulated raster image 135. The IM program or engine 130 uses the feature path file 125 to define boundaries, where graphic manipulation operations of the IM program or engine 130 are confined or constrained by these boundaries. The manipulated raster image 135 may include one or more post-manipulation (PM) features 140. The PM features 140 correspond to at least one feature of the initial raster image 105, where a bound (by one of the extracted features 116) graphics manipulation operation has been performed.

Figure 2:
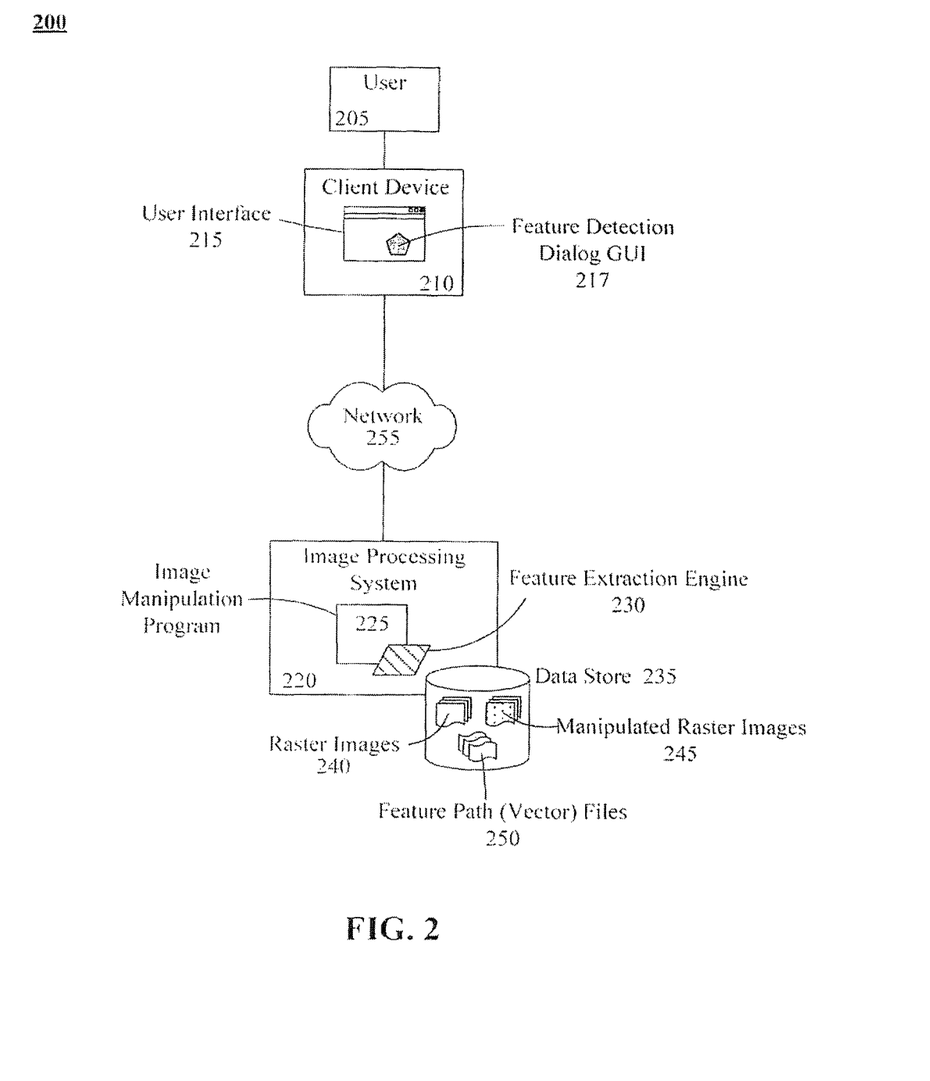
FIG. 2 is a schematic block diagram of a feature identification and extraction system in accordance with an embodiment.

The image manipulation program or engine 130 illustrated in FIG. 1 and the imagine manipulation program or engine 225 illustrated in FIG. 2 are each synonymous with an IM program or an IM engine and may be referenced as an image manipulation program/engine.

In an embodiment, the initial raster image 105 may be a digital photograph of a street-scene. The scene can include multiple buildings that have windows of varying sizes that are to be extracted as part of the image processing procedure.

The feature extraction engine 120 may be invoked to create a feature path file 125 for the initial raster image 105. The feature path file 125 may be thought of as a line drawing representation of the extracted features 116 of the initial raster image 105.

It is important to note that conventional approaches for generating a feature path file 125 require a significant amount of user interaction. Using the process shown in diagram 100, the user interaction required by the feature extraction engine 120 is the selection of parameters that is to be used to identify a feature for generating the feature path file 125.

For example, a conventional semi-automated approach may require a user to be present during generation of the feature path file 125 in order to approve, reject, or modify each extracted feature 116. The feature extraction engine 120 as described herein, however, can produce the feature path file 125 without this interaction on the part of a user.

Once the feature path file 125 has been created for the initial raster image 105, both the initial raster image 105 and feature path file 125 may be used by IM program or engine 130 to produce the manipulated raster image 135.

Hence, the feature path file 125 may be used to selectively modify the initial raster image 105 to produce the manipulated raster image 135. For example, the areas defined that represent windows can be lightened while the walls are darkened. This produces a convincing night scene that correlates to the day scene. Windows and walls reflect light and transmit heat differently. Feature detection and manipulation facilitates the assignment of different material codes to each pixel.

FIG. 2 is a schematic block diagram of a feature identification and extraction system 200. In an embodiment, the system 200 may utilize a feature extraction engine 230.

In the system 200 illustrated in FIG. 2, a user 205 may execute the functionality of an image processing system 220 via a user interface 215 running on a client device 210. The client device 210 may represent a variety of computing devices capable of supporting operation of the user interface 215 and capable of communicating with the image processing system 220 over a network 255. In an embodiment, the client device 210 may communicate directly with the image processing system 220. In another embodiment, the client device 210 and the image processing system 220 may be integrated into a single computer or computing device.

The image processing system 220 can represent the hardware and/or software required to perform a variety of image manipulation operations. The image processing system 220 may include an image manipulation program or engine 225 and a data store 235 for storing raster images 240, feature path files 250, and manipulated raster images 245.

However, the data store 235 need not store raster images 240, feature path files 250 and manipulated raster images 245, and may only store at least one of these data. It should be noted that the image processing system 220 can include additional components (not shown) for performing other image processing functions.

The image manipulation program or engine 225 may be a software application designed to perform a variety of operations upon image files, such as the raster images 240 contained in the data store 235. A GNU image manipulation program (such as, by way of non-limiting example GIMP™) may be an example of an image manipulation program or engine 225 suitable to operate in system 200.

The image manipulation program or engine 225 can include a feature extraction engine 230. The feature extraction engine 230 can be a software application that interfaces with the image manipulation program or engine 225 to produce feature path files 250 for selected raster images 240. Communication between the feature extraction engine 230 and the image manipulation program or engine 225 can utilize applicable protocols, programming languages, and/or application programming interfaces (APIs).

For example, the feature extraction engine 230 can be a plug-in component for GIMP that uses the GIMP API to execute functions using GIMP.

In another embodiment, the feature extraction engine 230 can be a stand-alone software component that is separate and/or remotely-located from the image manipulation program or engine 225. In such an embodiment, the communications between the feature extraction engine 230 and image manipulation program or engine 225 may be conveyed over the network 255.

Operations or techniques of the feature extraction engine 230 may include, but are not limited to, edge detection, edge linking, Gaussian blurs, histograms, and hysteresis. The feature extraction engine 230 can have a feature detection dialog graphical user interface (GUI) 217 that the user 205 can access via the user interface 215. User interface 215 can be a GUI that allows the user 205 to select and execute functions of the image manipulation program or engine 225. The feature detection dialog GUI 217 may be a GUI configured to accept user 205 entered values for the parameters of the feature extraction engine 230, as will be described in more detail in FIG. 6, where the parameters are received from the GUI 217 and communicated to the extraction engine 230. Using the parameters entered by the user 205 in the feature detection dialog GUI 217, the feature extraction engine 230 can generate a feature path file 250 for a specified raster image 240. The feature path file 250 can be a vector image file that defines the areas that correspond to the features contained in the raster image 240.

In another embodiment, the feature extraction engine 230 can be configured to focus on a specific type of feature. In such an embodiment, the feature extraction engine 230 can process the raster image 240 for only the features that it has been designed to identify.

For example, the feature extraction engine 230 may be configured to only identify windows within a raster image 240, leaving doors untouched.

Yet in another embodiment, the feature extraction engine 230 can have a menu that allows the user 205 to specify the type or category of the feature to be identified for extraction. As such, the feature extraction engine 230 can include logic for differentiating between the different types or categories of features. In an embodiment, the different types of features are architectural features of buildings, structures or the like.

Once the feature path file 250 has been generated, the user 205 can apply the feature path file 250 to the raster image 240 using the image manipulation program or engine 225. Application of the feature path file 250 to the raster image 240 can allow the user 205 to select the extracted or identified features of the image 240 and perform graphics manipulation functions upon the extracted or identified features.

In an embodiment, all occurrences of a particular extracted or identified feature of the image 240 may be selected or highlighted simultaneously so that graphics manipulation can be applied simultaneously across a selected area of the initial raster image or the entire raster image on the particular feature.

For example, using the "Path to Selection" function of GIMP, the user 205 can select every feature of a raster image 240 defined in the feature path file 250. Once the features are selected, the user 205 can then fill the selected areas of the raster image 240 with the background color of the image 240, removing the features.

Thus, the user 205 can use the feature path file 250 generated by the feature extraction engine 230 to produce a manipulated raster image 245.

It is important to emphasize that the feature extraction engine 230 can require the original image 240 to be of a raster graphics format (e.g., .BMP, .GIF, .JPEG, .PNG, etc.) and not a vector graphics format (e.g., .AI, .SVG, .WMF, etc.). However, the embodiments do not require that the original file 240 adhere to any specific file format.

Network 255 can include any hardware/software/and firmware necessary to convey data encoded within carrier waves. Data can be contained within analog or digital signals and conveyed though data or voice channels. Network 255 can include local components and data pathways necessary for communications to be exchanged among computing device components and between integrated device components and peripheral devices. Network 255 can also include network equipment, such as routers, data lines, hubs, and intermediary servers which together form a data network, such as the Internet. Network 255 can also include circuit-based communication components and mobile communication components, such as telephony switches, modems, cellular communication towers, and the like. Network 255 can include line based and/or wireless communication pathways.

As used herein, presented data store 235 can be a physical or virtual storage space configured to store digital information. Data store 235 can be physically implemented within any type of hardware including, but not limited to, a magnetic disk, an optical disk, a semiconductor memory, a digitally encoded plastic memory, a holographic memory, or any other recording medium. Data store 235 can be a stand-alone storage unit as well as a storage unit formed from a plurality of physical devices. Additionally, information can be stored within data store 235 in a variety of manners. For example, information can be stored within a database structure or can be stored within one or more files of a file storage system, where each file may or may not be indexed for information searching purposes. Further, data store 235 can utilize one or more encryption mechanisms to protect stored information from unauthorized access. Additionally, the extraction engine 230, image manipulation program or engine 225, or other component of the image processing system may feature an internal data storage to store the raster images 240, feature path files 250 and/or manipulated raster images 245.

Figure 3:
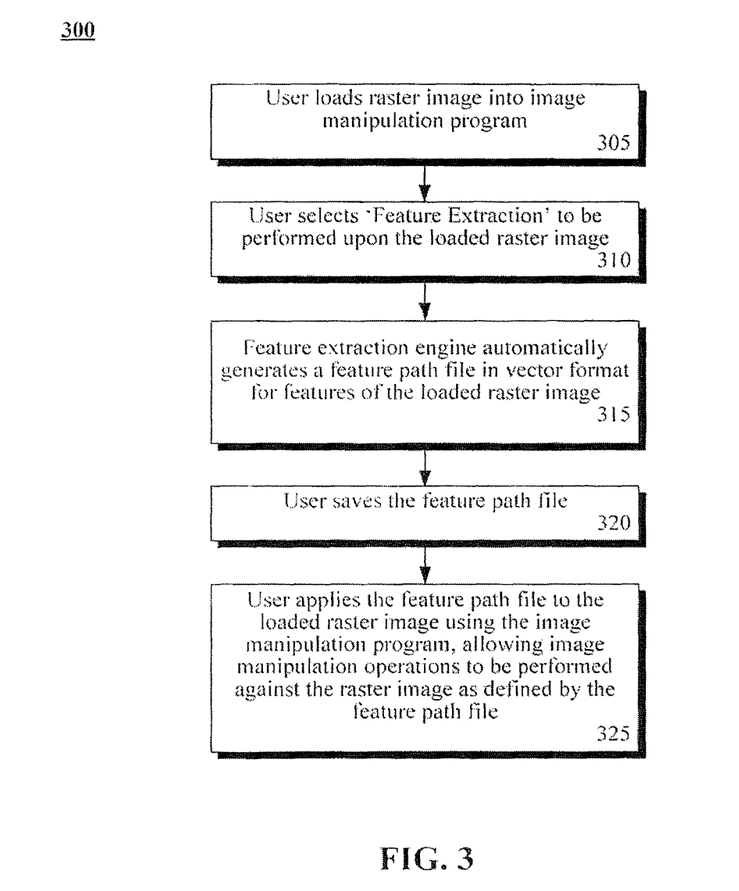
FIG. 3 is a flowchart of a method illustrating a raster image manipulation process in accordance with an embodiment.

FIG. 3 is a flowchart of a method 300 illustrating a raster image manipulation process in accordance with an embodiment. Method 300 can be performed within the context of the system 200. However, the method 300 is not limited to being performed within the context of the system 200, and may be performed within the context of any system which includes extraction and manipulation components to perform the steps in the method 300.

Method 300 can begin at step 305 where a user can load a raster image into an image manipulation program or engine, such as, without limitation, a GNU image manipulation program. At step 310, the user can select a command for 'Feature Extraction' to be performed upon the loaded raster image. In an embodiment, the user will select the 'Feature Extraction' command which invokes the feature extraction engine such as by accessing a feature detection dialog GUI, described below in relation to FIG. 6. The command can be presented to the user within the user interface of the image manipulation program or engine in a variety of ways, such as a menu option, a context menu option, a toolbar button, a keyboard short-cut, and the like.

In step 315, the feature extraction engine can automatically generate a feature path file in vector format for features contained in the loaded raster image based on a set of selected parameters. The user can then save the feature path file in step 320. Then, in step 325, the user can use the image manipulation program or engine to apply the feature path file to the loaded raster image in order to perform raster image manipulations. Execution of step 325 selects the features in the feature path file. Thus, the user then has the ability to perform image manipulation operations upon areas of the raster image that are defined by the feature path file.

Figure 4:
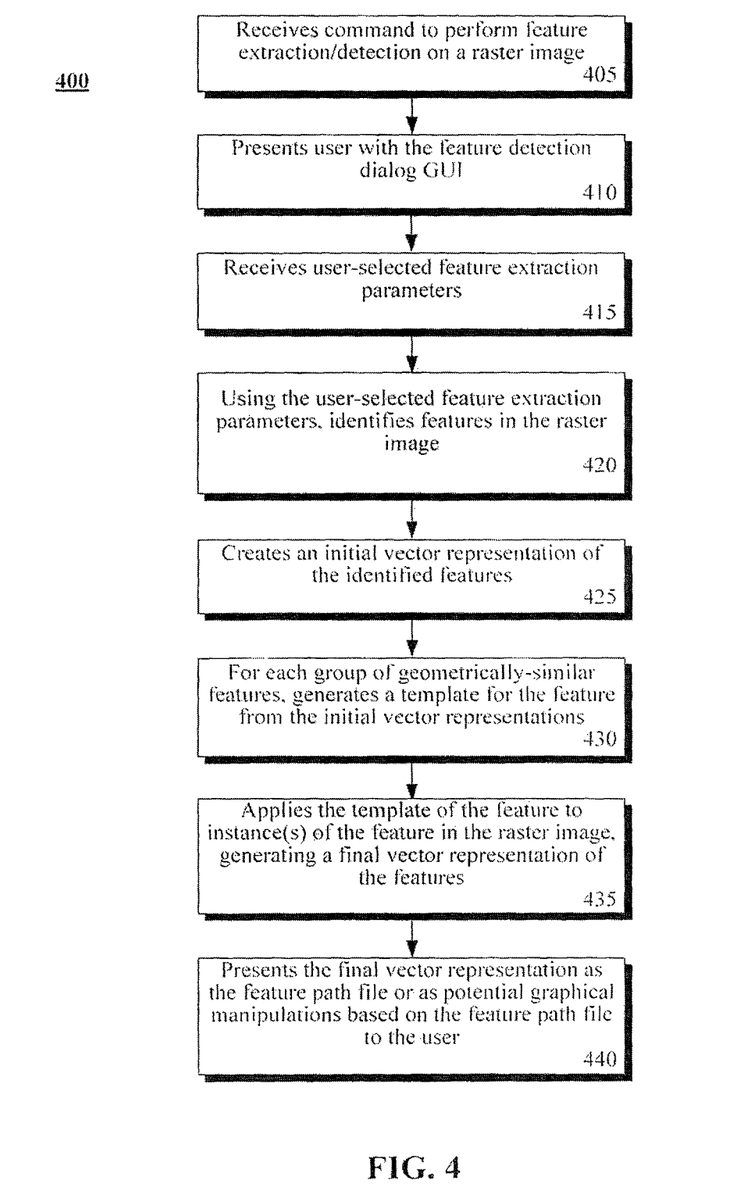
FIG. 4 is a flowchart of a method illustrating the feature identification and extraction in accordance with an embodiment.

FIG. 4 is a flowchart of a method 400 illustrating the feature identification and extraction process in accordance with an embodiment. Method 400 can be performed within the context of system 200 and/or in conjunction with method 300. However, the method 400 may be performed within the context of any system which includes extraction components to perform the steps in the method 400.

Method 400 can begin with step 405 where the feature extraction engine may receive a command to perform feature detection, and/or extraction on a raster image. The user can be presented with the feature detection dialog GUI in step 410. In step 415, the user-selected feature extraction parameters are received.

Using the user-selected feature extraction parameters, the feature extraction engine can identify the features in the raster image in step 420. The feature identification process is described in relation to FIG. 5. In step 425, an initial vector representation of the identified features can be created. The vector representation can define boundaries for the detected features or a subset thereof. An additional step may be provided, in which the initial vector representation of the identified features are segregated by the extraction engine 230, into one or more groups based on geometric similarity and/or planar orientation of the identified features on a planar surface within the image. For example, the extraction engine 230 may segregate a group of windows on an architectural structure into two different groups, with respect to a same planar surface of the architectural surface of each group of windows.

For each group of geometrically-similar features (i.e., all square windows, all rectangular windows, all semi-circular windows, etc.), a template representing the feature can be generated from the initial vector representations in step 430. That is, in step 430, the vector representations of geometrically-similar features can be compared to each other to synthesize a general shape to represent that group of geometrically-similar features. In a mathematical sense, step 430 can be thought of as normalizing the set of geometrically-similar features. At this step the initial vector representation of the identified features may be refined wherein refinement removes errant vectors and normalizes the initial vector representations of the identified features.

In step 435, the template of the feature can be applied to each instance of the feature in the raster image. In an embodiment, the final vector representation of the features in the raster image is generated, by replacing the initial vector representations of the features with the template. For example, the initial vector representations for a group of rectangular windows of roughly the same size can be replaced with the template generated in step 430 for the group of rectangular windows, to generate the final vector representation. Each template can define characteristics for a related type or category of the feature. In one embodiment, window template(s), gutter template(s), door template(s), parking lot template(s), and the like can exist. Thus, a list of templates may be generated. Each template is dynamically generated for the perspective view or orientation of the architectural structure in the raster image.

The execution of steps 430 and 435 has been performed for each group of geometrically-similar features which can result in a final vector representation of the features that defines boundaries of the each of the detected features. The final vector representation can then be presented as the feature path file (or a derivative thereof) to the user in step 440. The feature path file may be stored and used by a computing device and need not be presented to a user in one embodiment.

Figure 5:
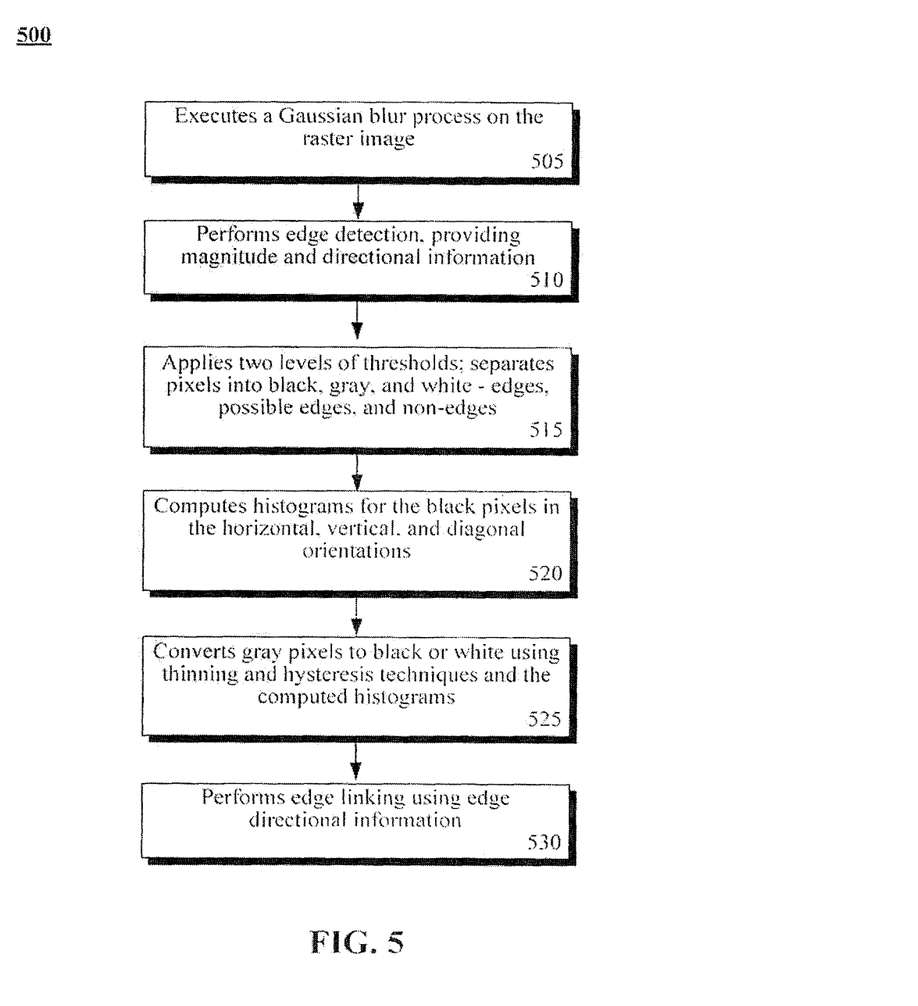
FIG. 5 is a flowchart of a method detailing the feature identification process in accordance with an embodiment.

FIG. 5 is a flowchart of a method 500 detailing the feature identification process in accordance with an embodiment.

Method 500 can begin in step 505 where the feature extraction engine executes a Gaussian blur process on the raster image, to generate a blurred raster image. The initial blur reduces image noise which can result in extraneous paths. The Gaussian blur process may be applied using a selectable kernel size and methods to reduce noise. A decision of whether or not to execute a Gaussian blur process can depend upon characteristics and properties of an initial raster image. An edge detection operation can be performed in step 510 on the blurred raster image. The edge detection operation of step 510 can provide magnitude and directional information for each pixel. Edges are detected where the magnitude and/or direction changes between adjacent pixels. The edge detection is performed using one of a plurality of edge detection algorithms. The algorithms may be further refined with a specifiable sensitivity.

In step 515, two levels of thresholds can be applied to the pixel values. Step 515 can separate the pixels of a detected edge into color groupings of black, gray, and white, representing edges, possible edges, and non-edges (hysteresis), respectively.

These color groupings may be considered predefined threshold values used to designate each pixel. Histograms for the black pixels can then be computed in the horizontal, vertical, and/or diagonal orientations in step 520. In step 525, the gray pixels can be converted to either black or white by applying thinning and/or hysteresis techniques to the gray pixels and comparing the results of the thinning and/or hysteresis with the computed histograms. Edge linking can then be performed in step 530 using the directional information derived in step 510. Step 530 essentially connects all the lines, such as, but not limited to, linking ends of the detected edges that are proximate to each other, of a feature to create a closed shape. In an embodiment, a removing step may be performed of the detected edges from the initial vector representation of the raster image, when a result of the edge linking step 530 does not create a closed shape by linking all ends of the detected edges that are proximate to each other.

Figure 6:
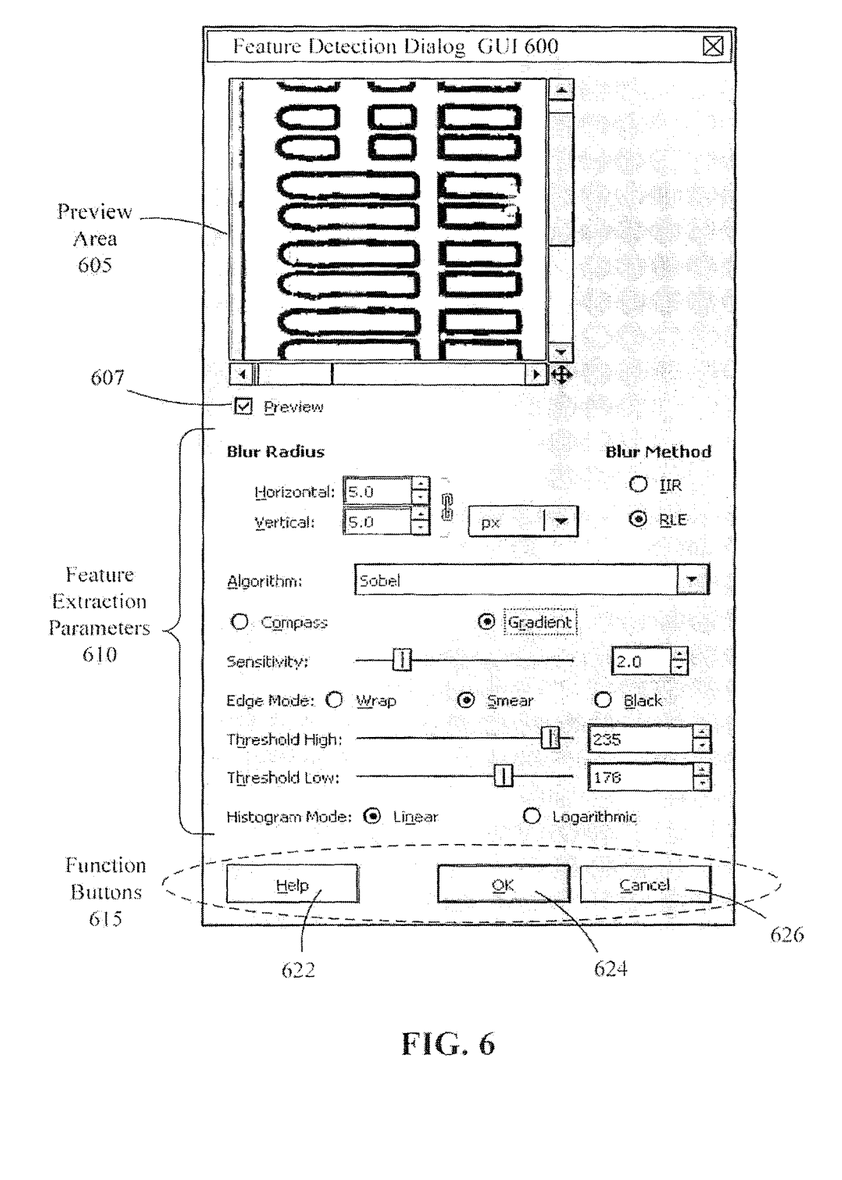
FIG. 6 illustrates a feature detection dialog graphical user interface (GUI) in accordance with an embodiment.

FIG. 6 illustrates a feature detection dialog GUI 600 for use with the feature extraction engine in accordance with an embodiment.

The feature detection dialog GUI 600 can be a graphical user interface (GUI) that allows a user to input values for various feature extraction parameters 610 using one or more of data entry fields, radios, buttons and/or slide controls. The feature extraction parameters 610 are executed by the feature extraction engine to generate the feature path file of the raster image.

Although the feature extraction parameters 610 can include, but are not limited to, a horizontal and vertical blur radius, a blur method, one or more edge detection algorithms, a method to detect or manipulate edges, upper and lower variable thresholds for edge detection, different histogram modes, variable sensitivity and the like. Examples of histogram modes include, but are not limited to, linear and logarithmic. Examples of Blur methods include, but are not limited to, filters for Infinite Impulse Response (IIR) and Run Length Encoding (RLE). Examples of the edge detection algorithms include, but are not limited to, Sobel, Prewitt, Kirsch, Robinson, Gradient, Roberts, Differential and Laplace. The edge modes may include, but not limited to, wrap, smear and black. One or more of the feature extraction parameters may be supported by the IM program or engine. If the feature extraction engine 120 is a plug in, one or more of the feature extraction parameters may be accessed through the IM program or engine 130, if supported by the IM program or engine 130.

The effects of changes to the values of the feature extraction parameters 610 can be dynamically presented to the user within a preview area 605 of the feature detection dialog GUI 600. This may assist the user in selecting values for the feature extraction parameters 610 that produce the desired result. Display of the preview area 605 can be toggled on and off using a preview control 607. Although FIG. 6 illustrates a preview area 605 in the GUI 600, the GUI need not include a preview area and need only include an interface for the user to input parameters of the extraction parameters.

Function buttons 615 can allow the user to execute the functions associated with the feature detection dialog GUI 600. As shown in this example, the function buttons 615 can include a help button 622, an OK button 624, and a cancel button 626. The GUI 600 may include less or more function buttons than these function buttons 615 illustrated in FIG. 6, depending on the specific application.

Selection of the help button 622 can present the user with a window in which helpful information about the feature detection dialog GUI 600 is presented. Selection of the OK button 624 can trigger the feature extraction engine to generate the feature path file using the values entered for the feature extraction parameters 610. The values of the feature extraction parameters 610 can be discarded and the feature detection dialog GUI 600 closed upon selection of the cancel button 626.

The embodiments described herein may be embodied as a method, system, or computer program product. Accordingly, an embodiment may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the disclosure may take the form of a computer program product on a computer-usable storage medium having computer-usable program code embodied in the medium. In an embodiment, the disclosure is implemented in software which includes, but is not limited to, firmware, resident software, microcode, etc.

Furthermore, an embodiment can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device. Any suitable computer-usable or computer-readable medium may be utilized. The computer-usable or computer-readable medium may be, for example, but not limited to, an electronic, magnetic, optical, electromagnetic, infrared, or semiconductor system, apparatus, or device. Non-limiting examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include, but are not limited to, compact disk-read only memory (CD-ROM), compact disk-read/write (CD-R/W) and DVD.

Computer program code for carrying out operations of the disclosure may be written in an object-oriented programming language such as JAVA, Smalltalk, C++, or the like. However, the computer program code for carrying out operations of the disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which may provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters, although other types may be utilized.

The disclosure is described below with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams in FIGS. 1-6 illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore the use of the term "at least one of" is intended to mean the same as the term "and/or," where either is used to indicate that either a choice between alternatives are included or all alternative choices are included.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited in the form disclosed. Many modifications and variations will be apparent to those of ordinary skill in the art without departing from the scope and spirit of the embodiments. The embodiments were chosen and described in order to best explain the principles and the practical application thereof, and to enable others of ordinary skill in the art to understand the embodiments with various modifications as are suited to the particular use contemplated.

What is claimed is:

1. A method comprising:
   identifying, by at least one processor, at least one feature in a raster image based on a set of extraction parameters, indentifying the at least one feature further comprising;
      executing, by the at least one processor, a Gaussian blur process upon a plurality of pixels of the raster image to produce a blurred raster image;
      performing, by the at least one processor, an edge detection process upon the blurred raster image, wherein said edge detection process provides magnitude information and directional information for each pixel;
      for said each pixel, applying, by the at least one processor, a predefined threshold value to designate said each pixel as one of a black pixel, a gray pixel, and a white pixel, wherein black pixels represent edges, gray pixels represent possible edges, and white pixels represent non-edges;
      for black pixels of a detected edge, computing, by the at least one processor, histograms in a horizontal orientation, vertical orientation, and diagonal orientation;
      for gray pixels of a detected edge, converting, by the at least one processor, said gray pixels to one of a black pixel and a white pixel using at least one of a thinning technique and a hysteresis technique to produce a result which is then compared to the histograms computed for the black pixels; and
      performing, by the at least one processor, an edge linking process upon detected edges that are proximate to each other based upon the directional information of the detected edges; and
   generating, by the at least one processor, a feature path file conforming to a vector format, the feature path file represents a plurality of instances of the at least one feature in the raster image.

2. The method of claim 1, wherein the plurality of instances of the at least one feature are roughly uniform in size and shape to each other with respect to a same planar orientation upon one or more architectural structures.

3. The method of claim 1, wherein the at least one feature corresponds to a specific type or category of an object contained in the raster image.

4. The method of claim 1, further comprising:
   creating, by the at least one processor, at least one initial vector representation of the at least one feature identified in the raster image;
   generating, by the at least one processor, at least one template of the at least one feature;
   identifying each instance of the at least one feature based on the at least one template; and
   generating a final vector representation of the plurality of instances of the at least one feature in the raster image.

5. The method of claim 4, further comprising:
   segregating, by the at least one processor, the at least one initial vector representation of the at least one feature into at least one group based upon geometric similarity and planar orientation; and
   wherein the final vector representation is generated once all initial vector representations have been replaced with a corresponding template.

6. The method of claim 1, further comprising:
   removing, by at least one processor, the detected edges from at least one initial vector representation of the raster image, when a result of the edge linking process does not create a closed shape by linking all ends of the detected edges that are proximate to each other.

7. The method of claim 1, further comprising:
   applying, by the at least one processor, the feature path file to the raster image using an image manipulation engine, wherein the applying of the feature path file allows image manipulation operations of the image manipulation engine to be performed upon the at least one feature of the raster image defined in the feature path file.

8. The method of claim 1, further comprising:
   receiving the set of extraction parameters from a user interface; and
   communicating the set of extraction parameters from the user interface to the at least one processor.

9. A system comprising:
   an extraction engine configured to identify at least one feature in a raster image based on a set of extraction parameters, said extraction engine further configured to generate a feature path file conforming to a vector format, said feature path file to represent a plurality of instances of the at least one feature in the raster image; and
   a data storage configured to store the raster image or the feature path file of the raster image;
   wherein the extraction engine is configured to identify the at least one feature based on the extraction engine being configured to execute a Gaussian blur process upon a plurality of pixels of the raster image to generate a blurred raster image, the extraction engine being configured to perform an edge detection process upon the blurred raster image to provide magnitude and directional information of each pixel of the raster image, the extraction engine being configured to apply a predefined threshold value for each pixel to designate each pixel as one of a black pixel representing edges, gray pixel representing possible edges and a white pixel representing non-edges, the extraction engine being configured to compute a histogram for each black pixel in a horizontal orientation, a vertical orientation and a diagonal orientation of the raster image, the extraction engine being configured to convert each gray pixel to one of a black pixel and a white pixel using at least one of a thinning technique and a hysteresis technique, said extraction engine being configured to compare the result of the one of the thinning technique and the hysteresis technique to the histogram, and the extraction engine being configured to perform an edge linking process upon detected edges that are proximate to each other based upon the directional information of the detected edges.

10. The system of claim 9, further comprising:
    an image manipulation engine configured to apply the feature path file to the raster image such that image manipulation operations are performed on the at least one feature of the raster image defined in the feature path file.

11. The system of claim 9, further comprising:
a user interface configured to receive the set of extraction parameters, said user interface further configured to transmit the set of extraction parameters to the extraction engine.

12. The system of claim 9, wherein the plurality of instances of the at least one feature are roughly uniform in size and shape to each other with respect to a same planar orientation upon one or more architectural structures.

13. The system of claim 9, wherein the at least one feature corresponds to a specific type or category of an object contained in the raster image.

14. The system of claim 9, wherein the extraction engine is configured to create at least one initial vector representation of the at least one feature identified in the raster image, wherein the extraction engine is configured to generate at least one template of the at least one feature, wherein the extraction engine is configured to identify each instance of the at least one feature based on the at least one template; and wherein the extraction engine is configured to generate a final vector representation of the plurality of instances of the at least one feature in the raster image.

15. The system of claim 14, wherein the extraction engine is configured to segregate the initial vector representation of the at least one feature into at least one group based upon geometric similarity and planar orientation, and wherein the extraction engine is configured to generate the final vector representation upon a replacement of the initial vector representation of the at least one feature with the at least one template.

16. The system of claim 9, wherein the extraction engine is configured to remove the detected edges from at least one initial vector representation of the raster image, when a result of the edge linking process does not create a closed shape by linking ends of the detected edges that are proximate to one another.

17. A non-transitory processor readable storage medium, providing an executable computer program product, the executable computer program product comprising a computer software code that, when executed on a processor, causes the processor to:
identify at least one feature in a raster image based on a set of extraction parameters by executing a Gaussian blur process upon a plurality of pixels of the raster image to produce a blurred raster image, performing an edge detection process upon the blurred raster image, wherein said edge detection process provides magnitude information and directional information for each pixel, for said each pixel, applying a predefined threshold value to designate said each pixel as one of a black pixel, a gray pixel, and a white pixel, wherein black pixels represent edges, gray pixels represent possible edges, and white pixels represent non-edges, for black pixels of a detected edge, computing histograms in a horizontal orientation, vertical orientation, and diagonal orientation, for gray pixels of a detected edge, converting said gray pixels to one of a black pixel and a white pixel using at least one of a thinning technique and a hysteresis technique to produce a result which is then compared to the histograms computed for the black pixels, and performing an edge linking process upon detected edges that are proximate to each other based upon the directional information of the detected edges; and
generate a feature path file conforming to a vector format, the feature path file represents a plurality of instances of the at least one feature in the raster image.

18. The computer program product of claim 17, wherein the computer software code that, when executed on a processor, further causes the processor to:
create at least one initial vector representation of the at least one feature identified in the raster image;
generate at least one template of the at least one feature;
identify each instance of the at least one feature based on the at least one template; and
generate a final vector representation of the plurality of instances of the at least one feature in the raster image.

* * * * *